US008477348B2

(12) United States Patent
Matsuzawa (10) Patent No.: US 8,477,348 B2
(45) Date of Patent: Jul. 2, 2013

(54) UPDATING A PRINT BUTTON FOR A DOCUMENT DISPLAYED ON A USER INTERFACE OF A PRINTER

(75) Inventor: Noriko Matsuzawa, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 12/694,246

(22) Filed: Jan. 26, 2010

(65) Prior Publication Data

US 2010/0202016 A1    Aug. 12, 2010

(30) Foreign Application Priority Data

Feb. 12, 2009    (JP) .................................. 2009-030185

(51) Int. Cl.
  *G06F 3/12*     (2006.01)
  *G06F 15/00*    (2006.01)
  *G06K 1/00*     (2006.01)

(52) U.S. Cl.
  USPC ........................... 358/1.15; 358/1.9; 358/1.13

(58) Field of Classification Search
  None
  See application file for complete search history.

(56) References Cited

U.S. PATENT DOCUMENTS

| 2002/0049837 | A1* | 4/2002 | Kato ............................. 709/223 |
| 2002/0138564 | A1* | 9/2002 | Treptow et al. ............... 709/203 |
| 2002/0196460 | A1* | 12/2002 | Parry ........................... 358/1.15 |
| 2003/0234957 | A1* | 12/2003 | Ohara ........................... 358/1.15 |
| 2005/0275867 | A1* | 12/2005 | Higashiura et al. .......... 358/1.14 |
| 2006/0087680 | A1* | 4/2006 | Maeda ........................... 358/1.15 |
| 2006/0232811 | A1* | 10/2006 | Yokoyama .................... 358/1.14 |

FOREIGN PATENT DOCUMENTS

| JP | 2002-149552 | 5/2002 |
| JP | 2007-249858 | 9/2007 |
| JP | 2008-40716  | 1/2008 |
| JP | 200840845   | 2/2008 |

OTHER PUBLICATIONS

Japanese Office Action dated Nov. 27, 2012 issued during prosecution of related Japanese application No. 2009-030185.

* cited by examiner

*Primary Examiner* — Ming Hon
(74) *Attorney, Agent, or Firm* — Fitzpatrick, Cella, Harper & Scinto (57) ABSTRACT

An information processing apparatus is provided, to which a printer is connected via a network. The device receives print setting information for a document from said client device, a component configured to preserve the received print setting information and a flag which is set for each user in order to show whether a user connected via said printer printed said document or not, transmits print setting information of a document to said printer according to said flag, wherein the document is not printed by a user connected via said printer, and when a user instructed said printer to print the document which was not printed according to the transmitted information and printing according to the instruction resulted in success, updates said flag to show that the user has printed the document and transmits information for changing a display form of the setting information for the document.

7 Claims, 8 Drawing Sheets

PRINT BUTTON INFO

- BUTTON INFO
  - BUTTON ID
  - BUTTON NAME
  - DISPLAY FORM
  - BUTTON DELETION CONDITION
- PRINT DOC INFO
  - DOC ID
  - DOC TYPE
  - INDEX
- PRINT SETTING INFO
  - SIZE
  - COLOR MODE
  - Nin1
  - STAPLING
  - BINDING
- PRINT USER
  - USER ID
  - BUTTON DISPLAY FLAG
- BUTTON REGENERATION INFO
  - DOC MONITOR OR NOT
  - MONITOR VALID PERIOD

UPDATING A PRINT BUTTON FOR A DOCUMENT DISPLAYED ON A USER INTERFACE OF A PRINTER

BACKGROUND OF THE INVENTION

1. Field of the Invention

The present invention relates to an information processing apparatus and a method for processing in an information processing apparatus.

2. Description of the Related Art

Recently, webification trend of an office PC environment has been established. Along with this trend, webification UI has been developed in the field of MFP devices and is becoming one of differentiation techniques. Among these, an efficient utilization method attracts attention which makes use of respective characteristics of a PC and an MFP device connected with each other through the Web. Since the PC is utilized by an individual and the MFP device is shared by a plurality of users, it is required to minimize the occupation time of the MFP device per each user. For a function accommodating this requirement, a present MFP device is provided with a function of a Web browser and can perform document printing via the browser by referring to a folder or a document on a server.

Further, there is an advanced technique to display whether document modification or update (document content edition) has been done or not after a document on a server was printed, using a thumbnail or an icon when a document management system displays the document. In particular, there is an advanced technique to change printing operation depending on whether the document modification or update has been done or not (refer to Japanese Patent Laid-Open No. 2008-40845).

In a conventional printing system, a print setting preliminarily preserved in a server, once set, is a static setting, the contents of which are not changed unless a user intentionally changes the setting. Accordingly, the once set setting is used in common among a plurality of users and the printing is repeatedly performed by the same setting. Here, the print setting is displayed by a list or a button and a user can carry out document printing according to the print setting only by selecting a button.

Actually, however, for the printing of a document the same document is seldom printed repeatedly by the same user and the user needs to remember by himself or herself which document is not yet printed when the print setting remains after the printing as in the conventional case.

Further, in the advanced technique to change the display of a thumbnail or icon and printing operation depending on the modification or update of a document, it is necessary to display the document by digging down into a folder hierarchy in a document management client for confirming the thumbnail or icon display. Therefore, the best solution has not been provided for the requirement that a user can print a document which the user can print by himself or herself or desires to print, easily by judging the document at a glance on the MFP device without using a client PC (such as browsing a document list to be printed at login).

SUMMARY OF THE INVENTION

It is an object of the present invention to provide an information processing apparatus, a method for processing in an information processing apparatus, and a computer-readable medium which are capable of changing a display form of print setting information in a printer so as to indicating that a user has printed a document when printing resulted in success.

The present invention provides an information processing apparatus to which a printer is connected via a network. The apparatus comprises a component configured to receive print setting information for a document from the client device, a component configured to preserve the received print setting information and a flag which is set for each user in order to show whether a user connected via the printer printed the document or not, a component configured to transmit print setting information of a document to the printer according to the flag, wherein the document is not printed by a user connected via the printer, and a component configured to, when a user instructed the printer to print the document which was not printed according to the transmitted print setting information and printing according to the instruction resulted in success in the printer, update the flag so as to show that the user has printed the document and transmit information for changing a display form of the print setting information for the document in the printer.

It becomes possible to change the display form of the print setting information in the printer so as to indicate that the user has printed the document when the print result is successful.

It is possible not to display a print setting of the document once printed by the user while keeping a function that the user can select the document from a list and can print the document by pushing one button (or it becomes possible to change the display form or to change a display position, for example, to the last of the list).

Further, it is not necessary for the user to remember the document printed by himself or herself, since a button prompting the user to reprint is regenerated automatically to be displayed (or the document to be reprinted is displayed on the top of the list) when the document is modified or updated.

Further features of the present invention will become apparent from the following description of exemplary embodiments (with reference to the attached drawings).

DESCRIPTION OF THE EMBODIMENTS

Hereinafter, the best mode implementing the present invention will be described using the drawings.

Figure 1:
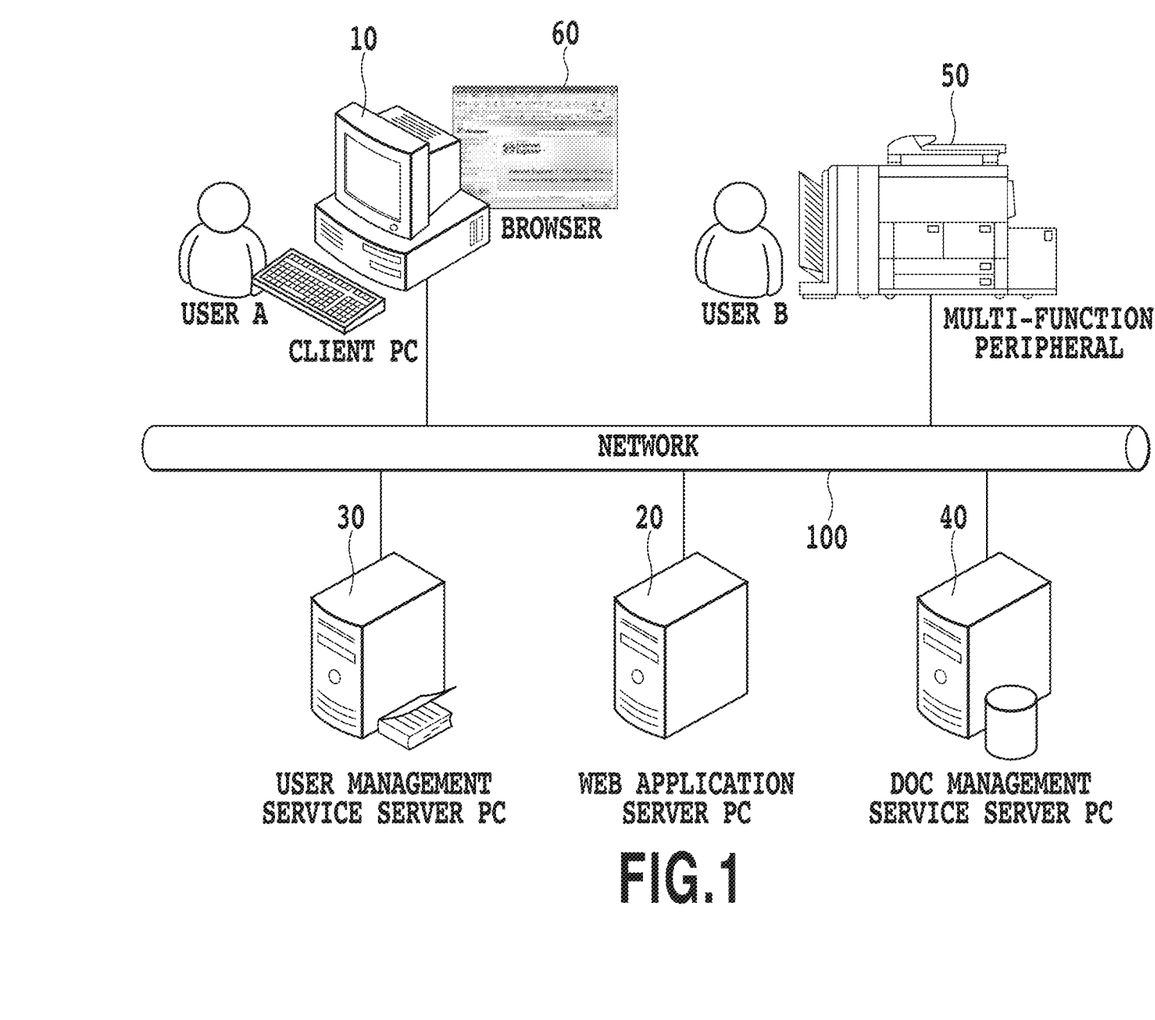
FIG. 1 is a system conceptual diagram of a document management system according to an embodiment of the present invention.

Note that, although the present specification represents information which can be browsed by a user on a screen of a multi-function peripheral 50 in FIG. 1 by a "button" and represents information which is exchanged in a system as data by "print setting information", they are substantially the same in the contents of the information.

[System Configuration]

FIG. 1 is a system conceptual diagram of a document management system according to an embodiment of the present invention. In the present system, a client PC 10, a Web application server PC (information processing apparatus) 20, a user management service server PC 30, a document management service server PC 40, and the multi-function peripheral 50 are connected to one another via a network 100. A user A accesses the document management system according to the present embodiment from the client PC 10 via a browser 60. A Web application of the document management system according to the present embodiment is provided by the Web application server PC 20. Information of a user who accesses the present system is managed by the user management service server PC 30. The document management service server PC 40 has a function of preserving/managing a document. A user B accesses the network 100 from the multi-function peripheral 50 via a UI thereof (internally, the UI is displayed by the use of a browsing function in the present embodiment).

Here, although the Web application server PC 20, the user management service server PC 30, and the document management service server PC 40 are configured to be arranged separately, one PC may be configured to have these server PC functions.

Further, although the user A is configured to operate the client PC 10, the user A may operate any of the above three server PCs or a server PC configured by the above single PC.

Further, although the user B is configured to operate the multi-function peripheral 50 having a print function and a scanner function, a scanner may be configured to be connected to the client PC 10.

Note that the document management system according to the present embodiment is configured in a manner such that the user A accesses each of the above sever PCs via the browser and the user B accesses each of the above server PCs via the UI of the multi-function peripheral. However, dedicated client applications (not shown in the drawing) may be arranged in the client PC 10 and the multi-function peripheral 50, and the user A and the user B may be configured to operate the dedicated client applications, respectively. In this case, not the Web application server (Web server) PC 20 but the document management service server PC 40 may be configured to communicate with the dedicated client applications.

[Hardware Configuration]

Figure 2:
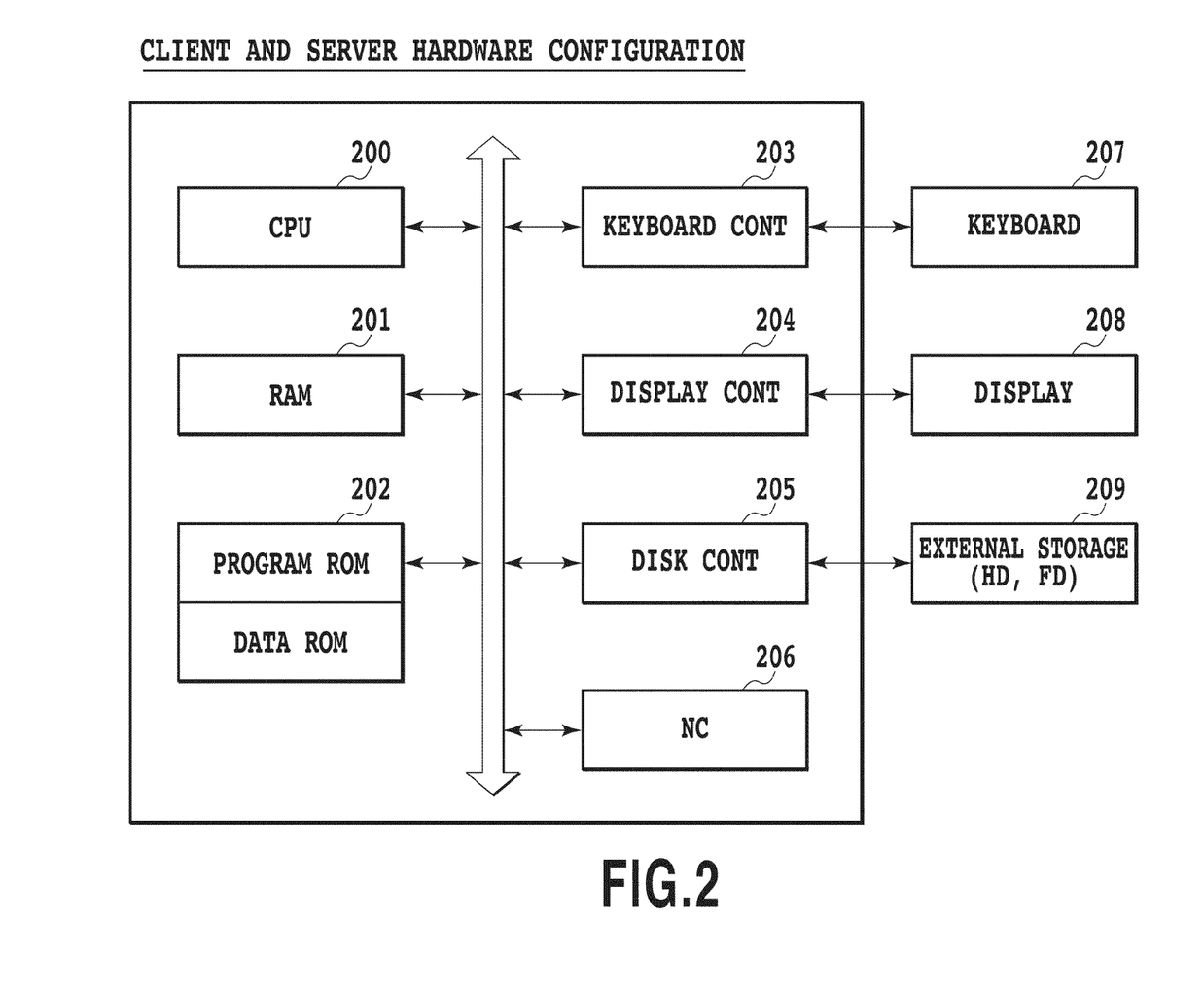
FIG. 2 is a hardware configuration diagram of a PC used in a document management system according to an embodiment of the present invention.
Figure 3:
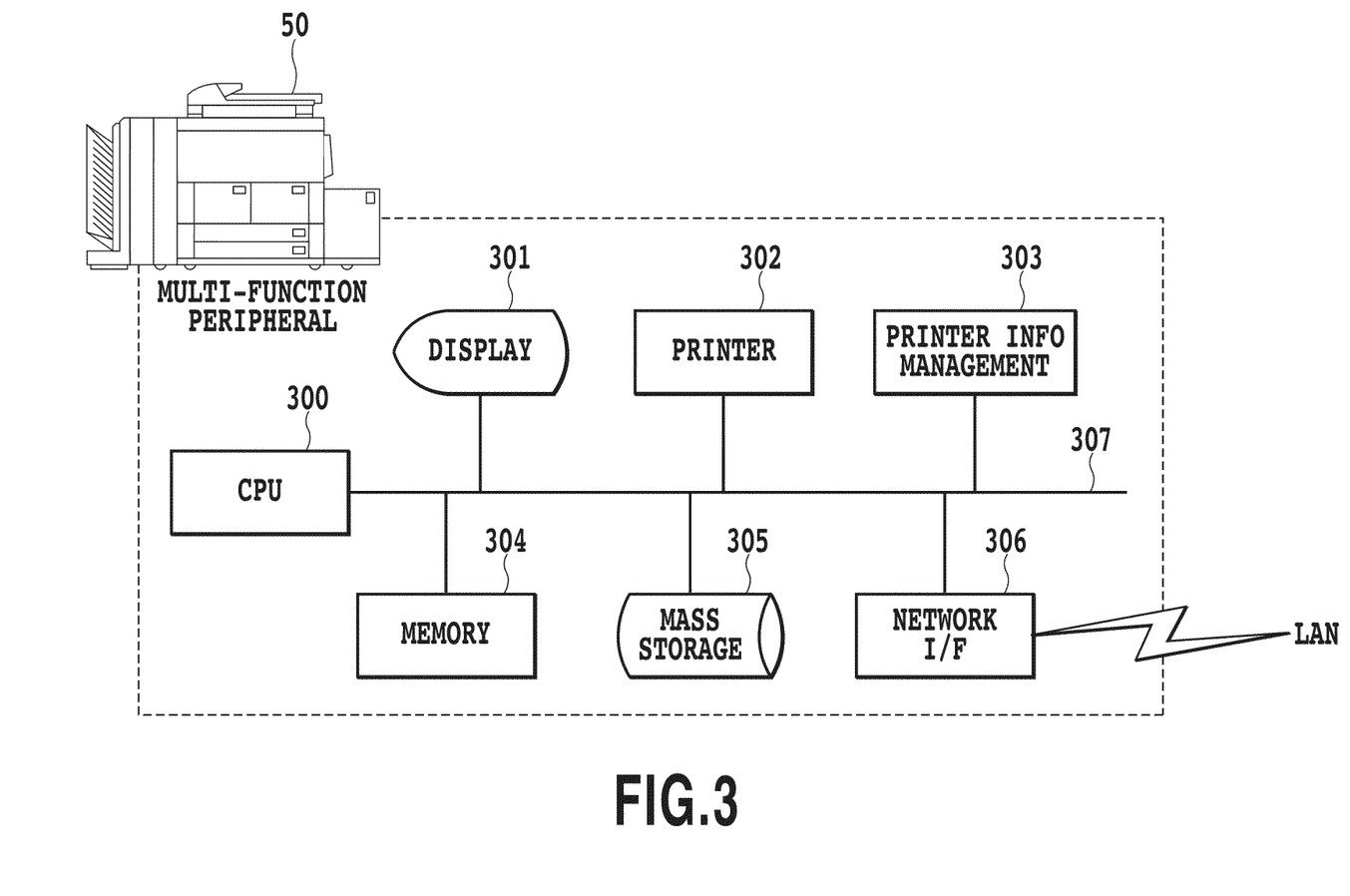
FIG. 3 is a hardware configuration diagram of a multi-function peripheral or MFP used in a document management system according to an embodiment of the present invention.

FIG. 2 is a block diagram showing a hardware configuration of each PC configuring the document management system according to the present embodiment. FIG. 3 is a block diagram showing a hardware configuration of each multi-function peripheral configuring the document management system according to the present embodiment. The hardware configurations shown in FIG. 2 and FIG. 3 correspond to typical hardware configurations of the information processing apparatus and the multi-function peripheral, respectively, and the typical hardware configurations can be applied to the respective PC and multi-function peripheral of the present embodiment.

In FIG. 2, a CPU 200 executes a program such as an OS and an application which are stored in a program ROM of a ROM 202 or loaded into a RAM 201 from an external storage device 209 such as a hard disk. Here, OS stands for an operating system which operates on a computer and the operating system is called OS hereinafter. The processing of each flowchart to be described hereinafter can be realized by the execution of these programs. The RAM 201 functions as a main memory, a work area, etc. of the CPU 200. A keyboard controller 203 controls a key input from a keyboard 207 or a pointing device (not shown in the drawing). A display controller 204 controls displays of various kinds of display 208. A disk controller 205 controls data access in the hard disk (HD) or a floppy (registered trade mark) disk (FD) 209. An NC 206 is connected to the network 100 and executes control processing of communication with other devices connected to the network 100.

In FIG. 3, a CPU 300 connects respective functions or apparatuses to be described hereinafter with one another via an internal bus 307 and controls the multi-function peripheral 50. A display unit 301 displays a screen such as a touch panel. A user carries out manipulation or the like for performing an operation which the user desires via the screen shown on the display unit 301. A printer unit 302 performs printing. A printer information management unit 303 manages/preserves information about the function/status of the printer unit 302. A memory 304 stores various orders (including an application program) to be executed by the CPU 300 for controlling the multi-function peripheral 50. A mass storage unit 305 temporarily preserves data to be printed in the printer unit 302. A network interface 306 performs signal transmission and reception via a LAN according to the control of the CPU 300.

[Software Configuration]

Figure 4:
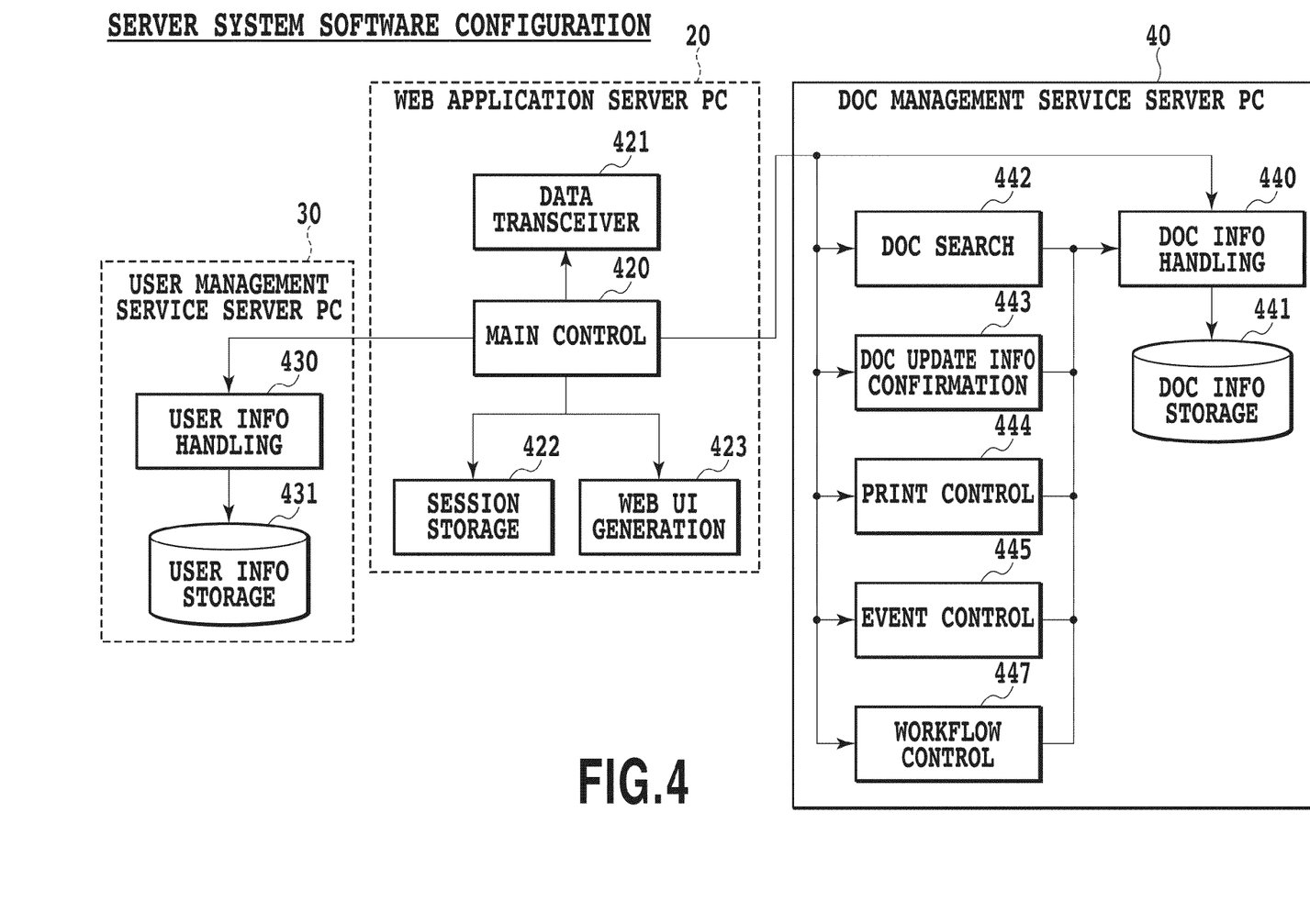
FIG. 4 is a software configuration diagram in a document management system according to an embodiment of the present invention.

FIG. 4 is a software configuration diagram showing an example of a document management system according to the present embodiment and shows software configurations in the Web application server PC 20, the user management service server PC 30, and the document management service server PC 40, respectively. Note that a main control unit 920 controls the entire document management system according to the present embodiment and performs instruction and management for each unit to be described hereinafter.

A data transceiver 421 receives an order issued by the user via the browser in the client PC 10 or the multi-function peripheral 50 and returns the result of an instruction from the main control unit 420 to the client PC 10 or the multi-function peripheral 50.

A session storage unit 422, when the user accesses the present document management system via the browser in the client PC 10 or the multi-function peripheral 50, generates session information for indicating that the access is made by the same user. Further, the session storage unit 422 preserves various kinds of information to be used repeatedly in association with the session information until the user stops the access to the present document management system (logout) or until the session is terminated by automatic time-out or the like.

A Web UI generation unit 423 generates a Web UI (HTML) corresponding to a situation by an instruction from the main control unit 420. Here, the Web UI generated by the Web UI generation unit 423 is not limited to the HTML type and a script language such as Java (registered trade mark) Script or the like may be embedded.

A user information handling unit 930 performs operation such as extraction and edition of the user capable of accessing the present document management system and user property (print setting information and the like) which are preserved in a user information storage unit 431, according to an instruction from the main control unit 420. Here, the user management may not be managed only by the document management system but may be performed by the user information handling unit 430 in cooperation with an existing technique such as Active Directory and LDAP, and the user information storage unit 431 may preserve only the user property.

A document information handling unit 440 performs registration, preservation, extraction, edition etc. for a document attribute including a document itself and index information preserved in a document information storage unit 441, according to an instruction from the main control unit 420.

A document search unit 442 determines a method for document search and obtains a document of a search result from the document information storage unit 441 via the document information handling unit 440 according to an instruction from the main control unit 420.

A document update information confirmation unit 443 confirms whether document update is carried out or not for a document printed by the user referring to the user information preserved in the user information storage unit 431, according to an instruction from the main control unit 420.

A print control unit 444 controls printing of a document specified by the user via the browser in the client PC 10 or the multi-function peripheral 50 according to an instruction from the main control unit 420. The print control unit 444 generates a print command interpretable for the multi-function peripheral 50 according to the print setting information preserved in the user information storage unit 431.

An event control unit 445 notifies the main control unit 420 of timing for updating the print setting information preserved in the user information storage unit 431 for an event such as preliminarily registered document modification and print permission setting using information retrieved from the document information handling unit 440.

A workflow control unit 447 manages a workflow according to an instruction from the main control unit 420. The workflow control unit 447 notifies the event control unit 445 via the main control unit 420 of that document printing has been permitted on the workflow. Alternatively, the print right change of the document may be carried out in the document information handling unit 440 via the main control unit 420, and the main control unit 420 or the document information handling unit 440 may notifies the event control unit 445.

In the following, processing in each step carried out by the document management system according to the present embodiment will be described specifically by the use of FIG. 1 to FIG. 8.

[Print Setting Information Registration]

Figure 5:
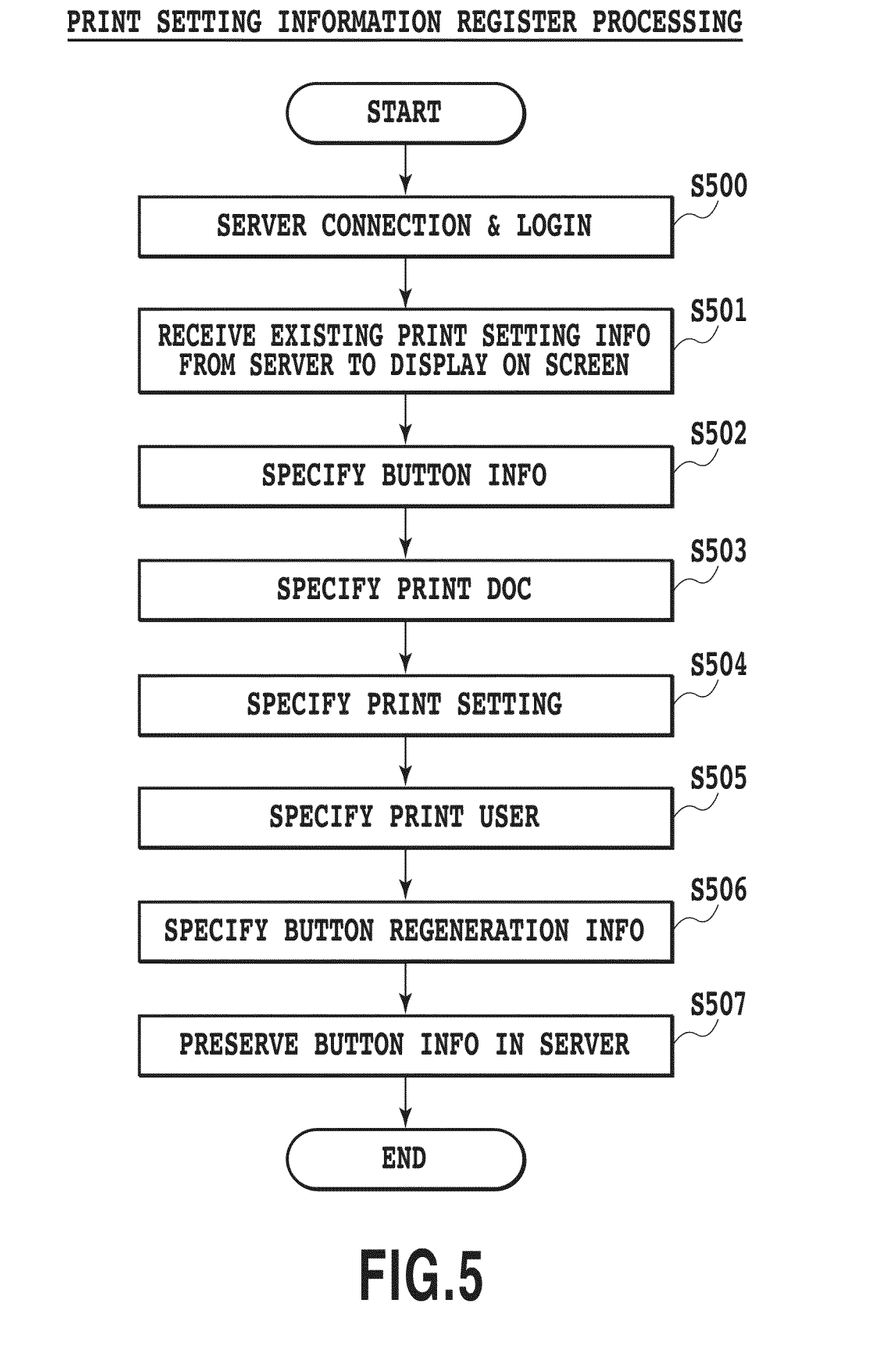
FIG. 5 is a diagram showing a print setting information registration flow by a document management system according to an embodiment of the present invention.

FIG. 5 is a flowchart showing a flow of print setting information registration processing in the document management system according to the present embodiment. The present embodiment particularly assumes that the print setting information registration is carried out in the client PC 10 of FIG. 1, but this may be read as the print setting information registration carried out in any of the server PCs 20, 30 and 40, or the multi-function peripheral 50.

First, in Step S500, a user connects to the Web application server PC 20 via the client PC 10 and carries out user authentication.

Next, in Step S501, the Web application server PC confirms whether print setting information has been preserved or not in the user information storage unit 431 via the main control unit 420. If the past print setting information is preserved, the Web application server PC 20 retrieves the information and displays it on a screen of the client PC 10.

Figure 6:
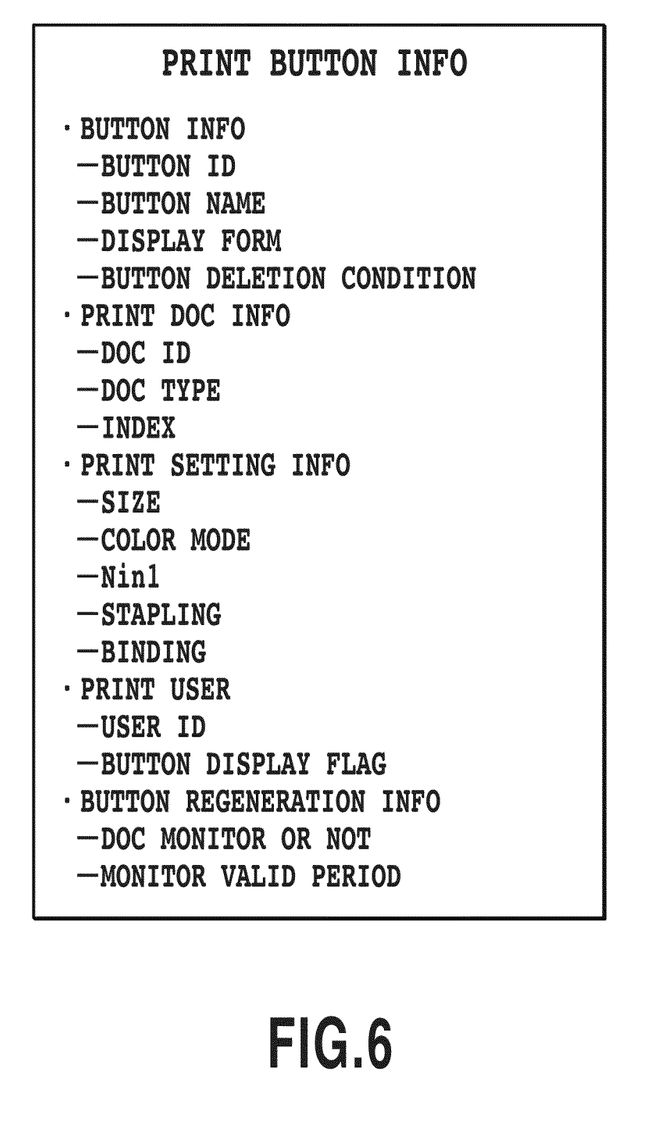
FIG. 6 is a diagram illustrating print button information in a document management system according to an embodiment of the present invention.

In Step S502, the client PC 10 accepts button information specified by a user via the keyboard 207. The button information includes a button ID, a button name, a button display form, and a button deletion condition, as shown in FIG. 6. Specifically, the button display form includes, for a button regarding printed document, discrimination by display/non-display, discrimination by button colors, discrimination by a display order in a list, etc. Specifically, the button deletion condition is as follows, for example; the button is deleted after the document has been printed by all the specified print users, or the button is deleted when a document monitoring period has passed and the document monitoring is out of the monitoring period and not within the monitoring period. The document monitoring setting is carried out in Step S506.

In Step S503, the client PC 10 accepts print document specification from the user via the keyboard 207. Print document information for the specification includes a document ID, a document type, an index, etc. as related information of a document specified by the user, as shown in FIG. 6. Although the case of specifying one document will be described here, actually a plurality of print documents may be specified.

In Step S504, the client PC 10 accepts a print setting from the user via the keyboard 207. The print setting includes a sheet size for printing, a color mode, a page layout such as two-in-one, a finisher setting such as stapling, a binding setting, etc., as shown in FIG. 6.

In Step S505, the client PC 10 accepts the specification of a print user (user who desires to print a document: when a user specified in this step logins to the multi-function peripheral 50 using a user ID, the print document information is displayed in a button format on the display device 301) from the user via the keyboard 207. A user who can be specified in this step is assumed to be a user who is managed in the user management service server PC 30. However, the user specified here may be configured to be newly registered in the user management service server PC 30, and a plurality of users may be specified as the print users. Further, as shown in FIG. 6, a button display flag is also set for determining whether the print setting information is to be displayed or not for each user. The button display flag is used for the determination of displaying the print setting information on a user setting screen as an unprinted document if the value is ON, and the determination of not displaying the print setting information or displaying the document in a lower priority if the value is OFF, according to the button display form specified in Step S502.

In Step S506, the client PC 10 accepts the specification of button regeneration information from the user via the keyboard 207. The button regeneration information includes information whether the print document is to be monitored or not, a valid period if the document is to be monitored, etc., as shown in FIG. 6. According to this valid period, the event control unit 445 determines a period for event notification.

In Step S507, the client PC 10 transmits the button information which has been set in the steps up to Step S506 to the Web application server PC 20. Subsequently, the main control unit 420 in the Web application server PC 20 carries out control so as to preserve the received button information in the user information storage unit 431 in the user management service server PC 30.

[Print Setting Information Display Update]

Figure 7:
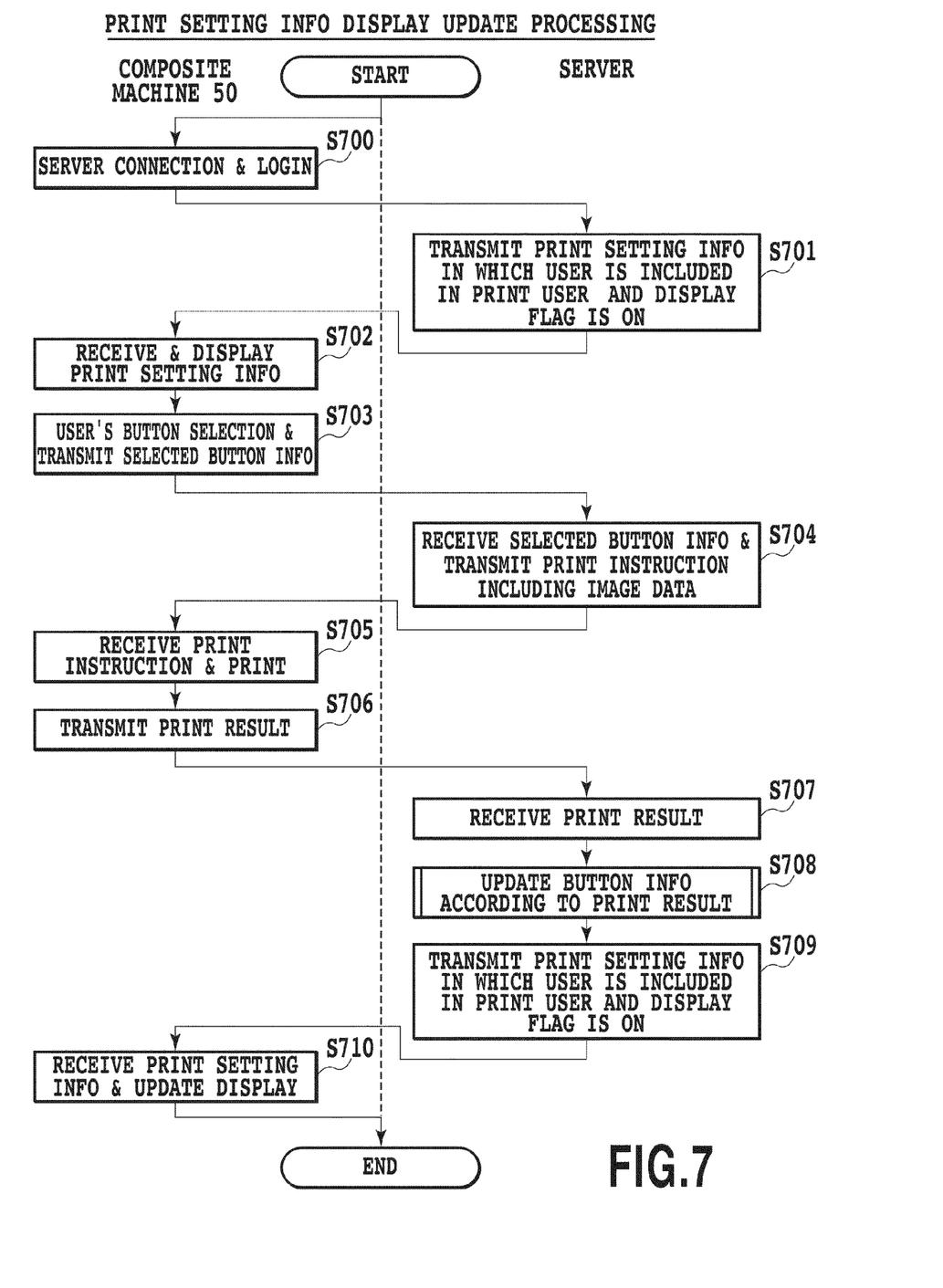
FIG. 7 is a diagram showing a display update flow of print setting information by a document management system according to an embodiment of the present invention.
Figure 8:
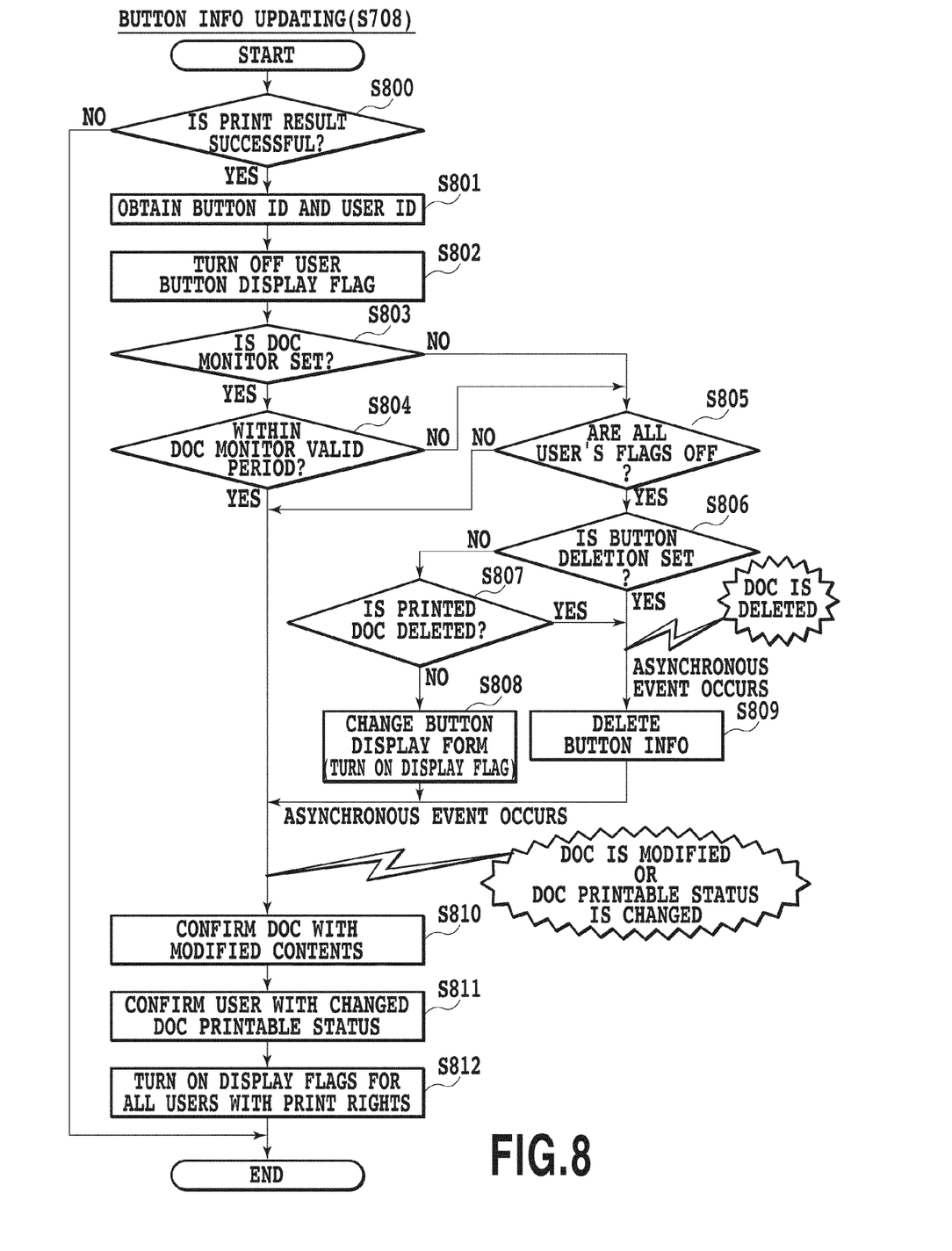
FIG. 8 is a diagram showing a detailed flow of print setting information update processing by a Web application server in an embodiment of the present invention.

FIG. 7 is a flowchart showing a processing flow updating the print setting information display in the document management system according to the present embodiment. FIG. 8 is a flowchart showing a detailed flow of print setting information update processing to be carried out in the Web application server PC 20 which has received a print result.

In the following, with reference to FIG. 7, it will be described that the print setting information display update is carried out when a user has printed a print document specified in the print setting information using the multi-function peripheral 50.

First, in Step S700, when a user inputs an connection instruction to the Web application server PC 20 and a user ID for user authentication in the operation unit of the multi-function peripheral 50, the multi-function peripheral 50 carries out the connection and the user authentication for the Web application server PC 20.

In Step S701, the main control unit 420 confirms that the login user is included as the registered print user, from the user information handling unit 430 in the user management service server PC 30, and also retrieves the print setting information of an unprinted document which has the ON display flag and transmits it to the multi-function peripheral 50.

In Step S702, the multi-function peripheral 50 receives the print setting information and displays (plural) buttons according to the print setting information. In succeeding Step S703, the multi-function peripheral 50 retrieves button information specified by the user and transmits it to the Web application server PC 20.

In Step S704, the Web application server PC 20 receives the button information specified by the user. The print control unit 944 in the document management service server PC 40 generates a print command according to the contents of the button information and transmits it to the multi-function peripheral 50 via the Web application server PC 20. Although the print command is assumed to include at least document data to be printed and a print setting (both sides?, binding?, etc.), the command is not limited if the information thereof allows the multi-function peripheral 50 to carry out printing.

In Step S705, the multi-function peripheral 50 receives and executes the print command from the Web application server PC 20 and thereby carries out the printing. In succeeding Step S706, the multi-function peripheral 50 notifies the Web application server PC 20 of a print result.

In Step S707, the Web application server PC 20 receives the print result and updates the button information according to the print result in subsequent Step S708. In subsequent Step S709, the Web application server PC 20 transmits the print setting information in which the login user is the print user and the display flag is ON to the multi-function peripheral 50 using the information updated for causing the multi-function peripheral 50 to carry out the button display according to the above button information.

In Step S710, the multi-function peripheral 50 receives the updated information from the Web application server PC 20 and updates the screen display.

Subsequently, FIG. 8 which shows the button information update processing in Step S708 in detail will be described.

First, in Step S800, the Web application server PC 20 determines whether the print result received from the multi-function peripheral 50 is successful or not, and retrieves the button ID and the login user information in Step S801 if the print result is successful.

In Step S802, the Web application server PC 20 updates and turns off the button display flag of the user who has succeeded in the document printing. Thereby, the button regarding the document printed at this time will not be displayed in the next screen displayed for the user (login user). When the screen is being displayed, obviously the button regarding the document printed at this time will not be displayed in the displayed screen.

In Step S803, the Web application server PC 20 confirms whether the document monitoring is set in the print setting information set in Step S502 (FIG. 5) of the print setting information registration process. If the document monitoring is set, the Web application server PC 20 moves to Step S804 and confirms whether the document monitoring is within the valid period, and carries out processing corresponding to asynchronous event occurrence in Step S810 and the following steps if the document monitoring is within the valid period. On the other hand, if the document monitoring is not set in Step S803 or if the valid period has expired in Step S804, the process goes to Step S805.

In Step S805, the Web application server PC 20 confirms the display flag settings for all the users specified as print users in the print setting information. If the display flags of all the users are OFF, the Web application server PC 20 confirms whether the button deletion condition set in Step S502 is that "the button is deleted after all the specified print users have finished printing", for the button deletion setting in Step S806.

If the button deletion is not set, the Web application server PC 20 confirms the existence of the print document in Step S807 and changes the button display form in Step S808 when the print document exists. In this step, the Web application server PC 20 provides the button specified for the printed document in Step S502 with the display form change processing according to whether the button is discriminated by display/non-display, discriminated by colors, or discriminated by an order in the list display, for example.

If the button deletion is set in Step S806, or if the print document is determined to have been deleted in Step S807, the Web application server PC 20 deletes the button information in Step S809. Although the existence of the print document is confirmed when the button deletion is not set in the present embodiment, instead a document deletion event may be issued from the document information handling unit 440 and the event control unit 445, and the button information can be deleted according to the document deletion event.

In this manner, when an asynchronous event that the document is updated or an asynchronous event that document printable status is changed occurs, the Web application server PC 20 subsequently confirms the document the contents of which have been modified, in Step S810. Next, in Step S811, the Web application server PC 20 confirms the user whose document printable status has been modified.

In Step S812, the Web application server PC 20 turns on the display flags for all the users who have printable rights and are not prohibited from printing among the print users specified in Step S505 of the print setting information registration processing (FIG. 5) using the information retrieved in Step S810 and Step S811.

Note that, although the above event is assumed to be an event generated by the event control unit 445 according to an instruction from the main control unit 420 or another module, the event may be directly received from another external module or OS. In particular, it is effective to cooperate with a system (not shown in the drawing) providing a workflow of document circulation, document approval or the like. That is, a user who has a document circulation right or a user who has a browsing right of an approved document may be defined as the document printable user, and an event may occur when the system (not shown in the drawing) providing the workflow starts the document circulation workflow, or when the document approval has been completed. Obviously, the event control unit 445 once receives the event from the system providing the workflow and may carry out internal processing (confirmation of access right, or the like), or the event or target user information may be received directly from the system providing the workflow.

As described above, according to the present embodiment, it is possible to cause the print setting of a document once printed by a user not to be displayed (or to change the display form or to change a display position to the last of a list, for example) while keeping the convenience of user's selection on a list or one button print capability.

Further, a button is automatically regenerated and displayed for prompting a user to reprint when a document is modified or updated (or the document is displayed on the top of the list), and thereby a user needs not to remember the document which has been printed by himself or herself.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-030185, filed Feb. 12, 2009, which is hereby incorporated by reference herein in its entirety.

What is claimed is:

1. An information processing apparatus to which a printer and a client device are connected via a network, the information processing apparatus comprising:
a component configured to receive print button information corresponding to a button for printing a document from said client device, wherein the print button information includes information of the document, a print setting of the document, a printing user of the document and a display form specified by a user of the client device, the display form indicating a display form change processing to be executed for changing the display form of the button of the document in a case that the document has been printed;
a component configured to preserve the received print button information and a flag which is set for each user in order to show whether or not the document has been printed for each user;
a component configured to transmit information of the button to be displayed in a user interface of the printer based on the preserved print button information and the preserved flag, wherein the button to be displayed in the user interface of the printer is the button for printing the document which has not been printed based on the button specified by a user of the printer; and
a component configured to, when the user of the printer instructed said printer to print the document by specifying the button corresponding the document and printing according to the instruction resulted in success in the printer, update said flag so as to show that the document has been printed based on the button specified by the user of the printer, and transmit information of the button which has been changed based on the display form of the button included in the print button information.

2. The apparatus according to claim 1, wherein said client device specifies the print button information based on an instruction of the user of the client device to transmit the specified print button information to the information processing apparatus.

3. The apparatus according to claim 1, wherein said printer:
retrieves said print button information, and displays the button for printing the document in the user interface of the printer based on the retrieved print button information;
transmits to said information processing apparatus information corresponding to the button which is selected by said user of the printer;
executes printing of the document corresponding to the button selected by said user of the printer; and
transmits a print result of the document.

4. The apparatus according to claim 1, further comprising:
a component configured to monitor whether the document is modified regardless of the flag setting for the user of the printer within a monitoring period, in a case that the monitoring of the document and the monitoring period are set based on an instruction of the user of the client device; and
a component configured to turn on the flags for all the users or the flag for a target print user when the document being monitored by the monitoring component is modified.

5. The apparatus according to claim 4, further comprising a component configured to delete said print button information when said set monitoring period has expired.

6. A method for processing in an information processing apparatus to which a client device for processing a document and a printer having a browsing function and a printing function are connected via a network, the method comprising the steps of:
(a) receiving print button information corresponding to a button for printing a document from said client device, wherein the print button information includes information of the document, a print setting of the document, a printing user of the document and a display form specified by a user of the client device, the display form indicating a display form change processing to be executed for changing the display form of the button of the document in a case that the document has been printed;
(b) preserving the received print button information and a flag which is set for each user in order to show whether or not the document has been printed for each user;
(c) transmitting information of the button to be displayed in an user interface of the printer based on the preserved print button information and the preserved flag, wherein the button to be displayed in the user interface of the printer is the button for printing the document which has not been printed based on the button specified by a user of the printer; and
(d) when the user of the printer instructed said printer to print the document by specifying the button corresponding to the document and printing according to the instruction resulted in success in the printer, updating said flag so as to show that the document has been printed based on the button specified by the user of the printer, and transmitting information of the button which has been changed based on the display form of the button included in the print button information.

7. A non-transitory computer-readable medium which stores a computer program for allowing an information processing apparatus, to which a client device and a printer are connected via a network, to execute processes comprising:

(a) receiving print button information corresponding to a button for printing a document from said client device, wherein the print button information includes information of the document, a print setting of the document, a printing user of the document and a display form specified by a user of the client device, the display form indicating a display form change processing to be executed for changing the display form of the button of the document in a case that the document has been printed;
(b) preserving the received print button information and a flag which is set for each user in order to show whether or not the document has been printed for each user;
(c) transmitting information of the button to be displayed in an user interface of the printer based on the preserved print button information and the preserved flag, wherein the button to be displayed in the user interface of the printer is the button for printing the document which has not been printed based on the button specified by a user of the printer; and
(d) when the user of the printer instructed said printer to print the document by specifying the button corresponding to the document and printing according to the instruction resulted in success in the printer, updating said flag so as to show that the document has been printed based on the button specified by the user of the printer, and transmitting information of the button which has been changed based on the display form of the button included in the print button information.

* * * * *